United States Patent
Roberge

(10) Patent No.: US 10,823,081 B2
(45) Date of Patent: Nov. 3, 2020

(54) CONCENTRIC POWER TAKEOFF TRANSMISSION

(71) Applicant: United Technologies Corporation, Farmington, CT (US)

(72) Inventor: Gary D. Roberge, Tolland, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 166 days.

(21) Appl. No.: 15/851,010

(22) Filed: Dec. 21, 2017

(65) Prior Publication Data
US 2019/0195138 A1  Jun. 27, 2019

(51) Int. Cl.
F02C 7/36 (2006.01)
F02C 7/32 (2006.01)
F16H 1/22 (2006.01)

(52) U.S. Cl.
CPC .......... F02C 7/32 (2013.01); F02C 7/36 (2013.01); F16H 1/222 (2013.01); F05D 2250/311 (2013.01); F05D 2250/36 (2013.01); F05D 2260/4031 (2013.01)

(58) Field of Classification Search
CPC .... F02C 7/36; F02C 7/32; F16H 1/222; F05D 2250/311; F05D 2260/4031; F05D 2250/36
USPC .......... 74/15.2; 60/773, 39.15, 802
See application file for complete search history.

(56) References Cited

U.S. PATENT DOCUMENTS

| | | | |
|---|---|---|---|
| 7,386,983 B2 | 6/2008 | Miller | |
| 8,814,502 B2 | 8/2014 | Eleftheriou | |
| 8,966,911 B2 | 3/2015 | Ress, Jr. et al. | |
| 2002/0189231 A1 | 12/2002 | Franchet et al. | |
| 2007/0022735 A1 | 2/2007 | Henry et al. | |
| 2008/0148881 A1* | 6/2008 | Moniz | F02C 7/32 74/15.6 |
| 2009/0205341 A1 | 8/2009 | Muldoon | |
| 2013/0139519 A1* | 6/2013 | Kesseli | F02C 9/26 60/773 |
| 2013/0247539 A1 | 9/2013 | Hoppe | |
| 2015/0308350 A1 | 10/2015 | Dobosz et al. | |
| 2016/0053691 A1 | 2/2016 | Ernst | |
| 2016/0169118 A1 | 6/2016 | Duong | |
| 2016/0201567 A1 | 7/2016 | Duong et al. | |
| 2016/0341129 A1* | 11/2016 | Wotzak | B23P 19/04 |
| 2017/0218848 A1 | 8/2017 | Alstad et al. | |

(Continued)

FOREIGN PATENT DOCUMENTS

EP  3135882 A1  3/2017
WO  2008082335 A1  7/2008

(Continued)

OTHER PUBLICATIONS

Extended European Search Report for EP Application No. 18214936.9; dated Apr. 29, 2019 (9 pages).

*Primary Examiner* — Toan C To
(74) *Attorney, Agent, or Firm* — Cantor Colburn LLP

(57) ABSTRACT

A power takeoff and gearbox system of a multi-spool gas turbine engine includes a low rotor towershaft operably connected to and driven by a first spool of the gas turbine engine, and a high rotor towershaft operably connected to and driven by a second spool of the gas turbine engine. The high rotor towershaft and the low rotor towershaft are concentric and extend to a common gearbox housing.

18 Claims, 4 Drawing Sheets

(56) References Cited

U.S. PATENT DOCUMENTS

| | | | |
|---|---|---|---|
| 2017/0234232 A1 | 8/2017 | Sheridan et al. | |
| 2017/0248081 A1 | 8/2017 | Roach et al. | |
| 2017/0284220 A1* | 10/2017 | Roberge | F02C 9/00 |
| 2018/0073437 A1* | 3/2018 | Simonetti | F02C 7/26 |
| 2018/0172012 A1* | 6/2018 | Plante | F04D 25/045 |
| 2018/0266329 A1* | 9/2018 | Mackin | F02C 7/36 |
| 2018/0283281 A1* | 10/2018 | Veilleux, Jr. | F02C 7/36 |
| 2018/0313274 A1* | 11/2018 | Suciu | F02C 7/36 |

FOREIGN PATENT DOCUMENTS

| | | |
|---|---|---|
| WO | 2008082336 A1 | 7/2008 |
| WO | 2009067048 A1 | 5/2009 |

* cited by examiner

CONCENTRIC POWER TAKEOFF TRANSMISSION

BACKGROUND

Exemplary embodiments pertain to the art of gas turbine engines, and more particularly to power takeoff on gas turbine engines.

Gas turbine engines utilize rotational energy from one or more rotor shafts of the gas turbine to provide power to drive electrical subsystems, thermal management systems and other aircraft subsystems. Such power extraction is typically accomplished via a tower shaft rotational coupled to a high rotor shaft of the gas turbine engine. Future aircraft systems are projected to need higher levels of power extraction for such systems. To accommodate this demand in a way that minimizes adverse impact on engine performance and operability, low rotor power takeoff systems are being explored. One method involves geared transmission from both high and low rotors. The addition of low rotor gears can cause the distance between high and low rotor thrust bearings to increase to accommodate gearing. Such an increase in distance between the high rotor thrust bearings and low rotor thrust bearings results in an increase in engine weight, overall length and cost, and loss of low rotor critical speed margin, etc. Alternate configurations are desired.

SUMMARY

In one embodiment, a power takeoff and gearbox system of a multi-spool gas turbine engine includes a low rotor towershaft operably connected to and driven by a first spool of the gas turbine engine, and a high rotor towershaft operably connected to and driven by a second spool of the gas turbine engine. The high rotor towershaft and the low rotor towershaft are concentric and extend to a common gearbox housing.

Additionally or alternatively, in this or other embodiments the low rotor towershaft is configured to be driven by rotation of a low pressure compressor of the gas turbine engine.

Additionally or alternatively, in this or other embodiments the high rotor towershaft is configured to be driven by rotation of a high pressure compressor of the gas turbine engine.

Additionally or alternatively, in this or other embodiments a low rotor bevel gear is fixed for rotation with the first spool and a low rotor bevel gear is fixed to the low rotor towershaft and meshed with the low rotor bevel gear such that rotation of the first spool drives rotation of the low rotor towershaft.

Additionally or alternatively, in this or other embodiments the low rotor towershaft and high rotor towershaft are axially disposed, relative to an engine central longitudinal axis, between a first spool thrust bearing and a second spool thrust bearing.

Additionally or alternatively, in this or other embodiments the low rotor towershaft is rotationally connected to a low rotor power takeoff shaft at the gearbox housing.

Additionally or alternatively, in this or other embodiments the low rotor power takeoff shaft is operably connected to one or more low rotor driven components, providing power thereto.

Additionally or alternatively, in this or other embodiments the high rotor towershaft is rotationally connected to a high rotor power takeoff shaft at the gearbox housing.

Additionally or alternatively, in this or other embodiments the high rotor power takeoff shaft is operably connected to one or more high rotor driven components, providing power thereto.

Additionally or alternatively, in this or other embodiments the low rotor towershaft and the high rotor towershaft are co-rotating.

Additionally or alternatively, in this or other embodiments the low rotor towershaft and the high rotor towershaft are counter-rotating.

In another embodiment, a gas turbine engine includes a high pressure compressor driven by a first shaft, a low pressure compressor driven by a second shaft, and a power takeoff and gearbox system. The power takeoff and gearbox system includes a high rotor towershaft operably connected to and driven by rotation of the first shaft, and a low rotor towershaft operably connected to and driven by rotation of the second shaft. The high rotor towershaft and the low rotor towershaft are concentric and extend to a common gearbox housing.

Additionally or alternatively, in this or other embodiments a low rotor bevel gear is fixed for rotation with the first spool and a low rotor bevel gear fixed to the low rotor towershaft and meshed with the low rotor bevel gear such that rotation of the low pressure compressor drives rotation of the low rotor towershaft.

Additionally or alternatively, in this or other embodiments the low rotor towershaft and high rotor towershaft are axially located, relative to an engine central longitudinal axis, between a low rotor thrust bearing and a high rotor thrust bearing.

Additionally or alternatively, in this or other embodiments the low rotor towershaft is rotationally connected to a low rotor power takeoff shaft at the gearbox housing.

Additionally or alternatively, in this or other embodiments the low rotor power takeoff shaft is operably connected to one or more low rotor driven components, providing power thereto.

Additionally or alternatively, in this or other embodiments the high rotor towershaft is rotationally connected to a high rotor power takeoff shaft at the gearbox housing.

Additionally or alternatively, in this or other embodiments the high rotor power takeoff shaft is operably connected to one or more high rotor driven components, providing power thereto.

Additionally or alternatively, in this or other embodiments the low rotor towershaft and the high rotor towershaft are co-rotating.

Additionally or alternatively, in this or other embodiments the low rotor towershaft and the high rotor towershaft are counter-rotating.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
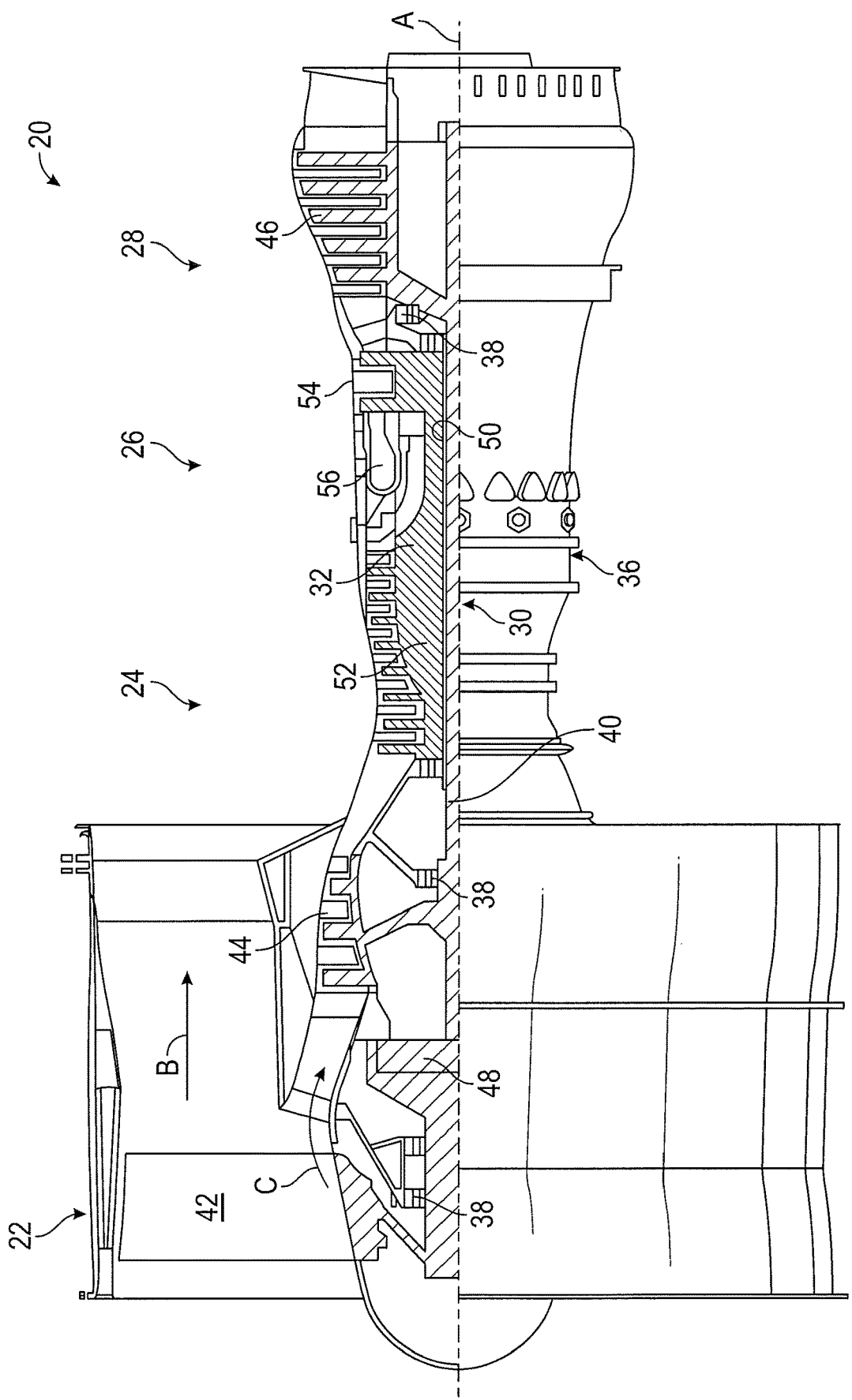
FIG. 1 is a cross-sectional view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower rotational speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is further compressed after exiting the fan by the low pressure compressor 44 then the high pressure compressor 52, mixed and burned with fuel in the combustor 56, then expanded through the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
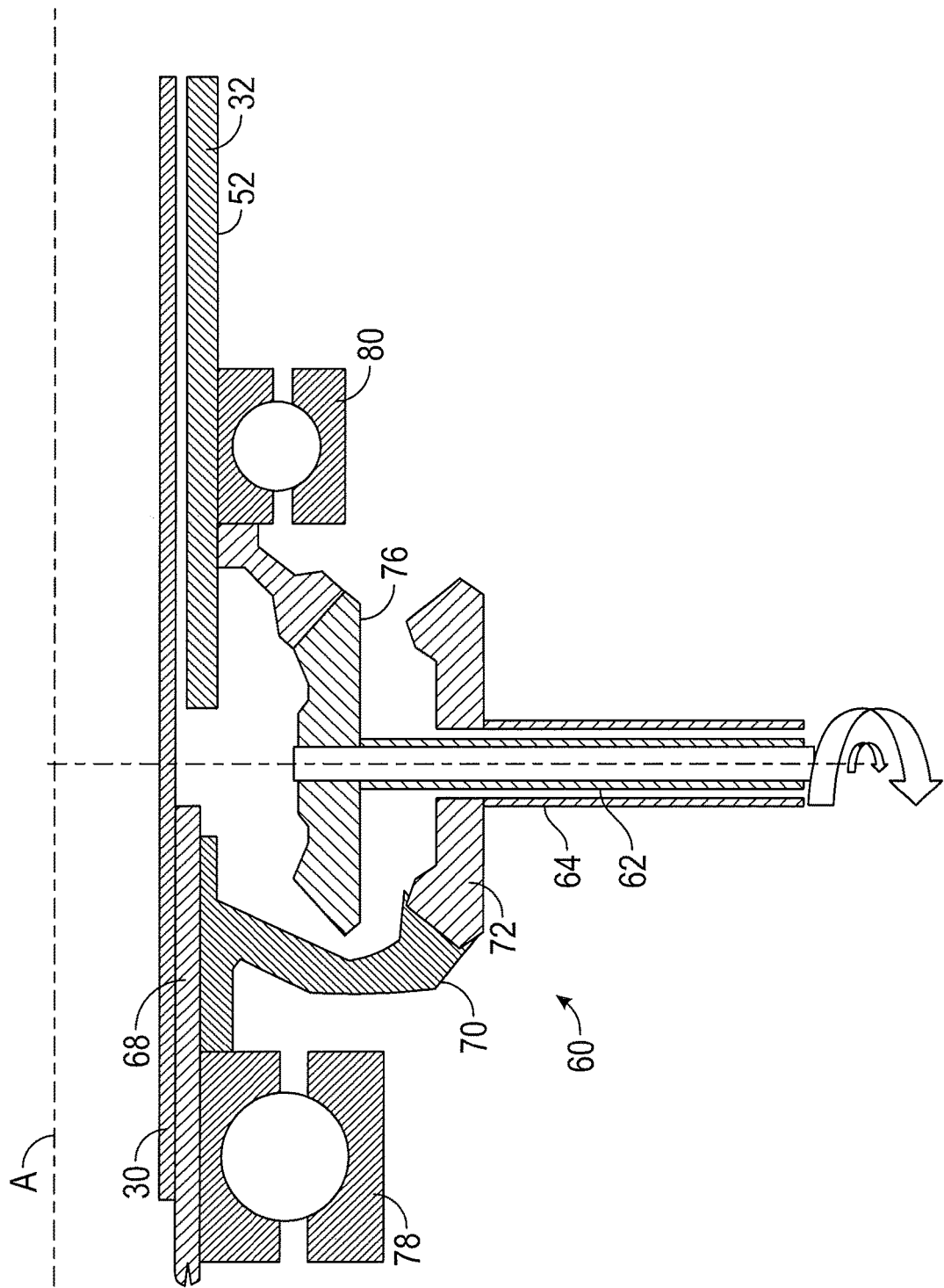
FIG. 2 is a partial cross-sectional view of an embodiment of a power takeoff and gearbox system of a gas turbine engine.
Figure 3:
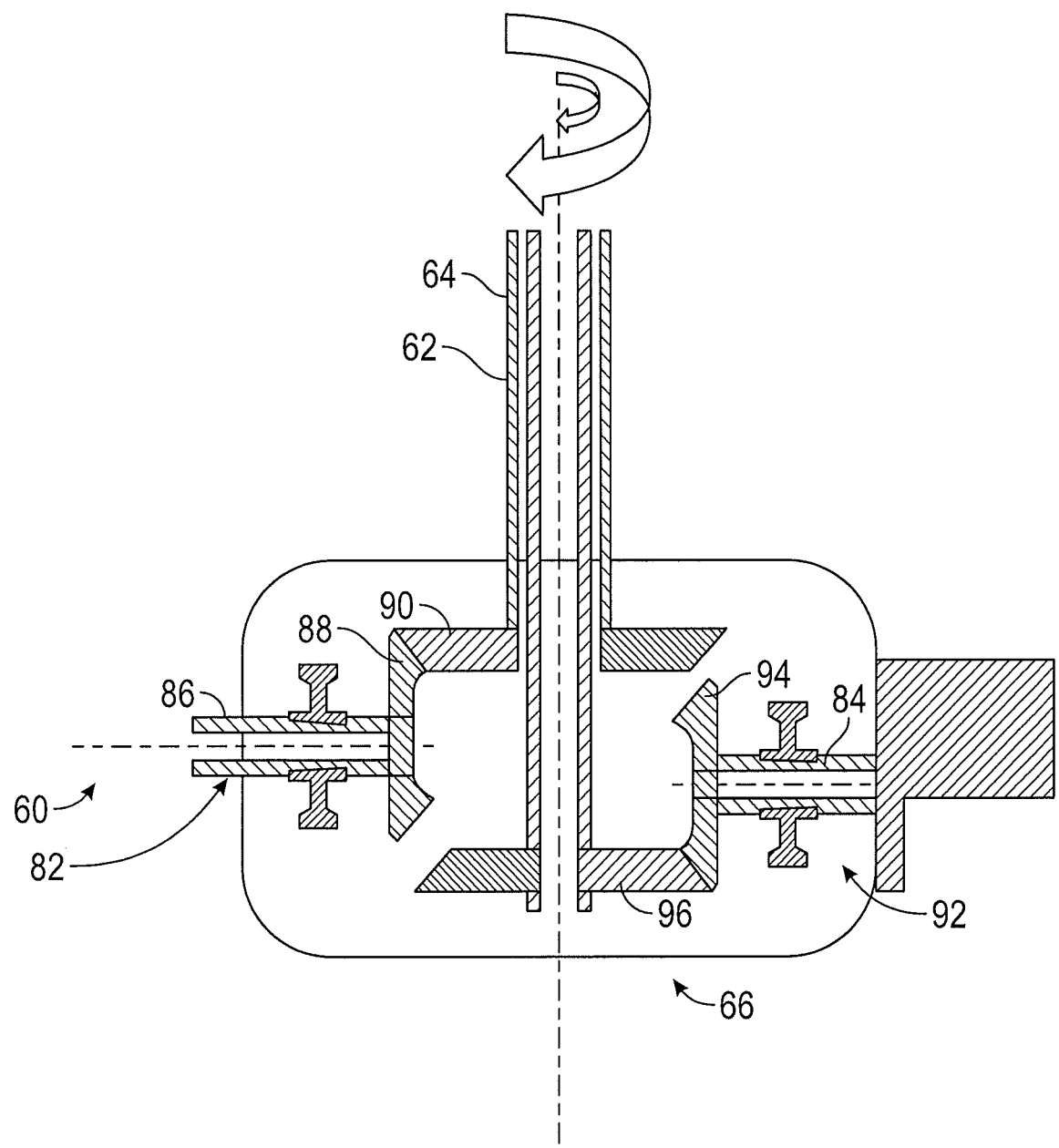
FIG. 3 is another partial cross-sectional view of an embodiment of a power takeoff and gearbox system of a gas turbine engine.

Referring now to FIG. 2, illustrated is an embodiment of a power takeoff and gearbox system 60. The system 60 includes a high rotor towershaft 62 operably connected to the high speed spool 32 to extract power from the rotation of the high speed spool 32. Further, the system 60 includes a low rotor towershaft 64 operably connected to the low speed spool 30 to extract power from the rotation of the low speed spool 30. The high rotor towershaft 62 is coaxial and concentric with the low rotor towershaft 64, with both the high rotor towershaft 62 and the low rotor towershaft 64 extending radially outwardly to an accessory drive gearbox housing 66, shown in FIG. 3. In some embodiments, the high rotor towershaft 62 and the low rotor towershaft 64 are co-rotating, while in other embodiments the towershafts 62, 64 are counter-rotating.

Referring again to FIG. 2, in some embodiments the low rotor towershaft 64 is connected to a rotating component of the low speed spool 30, such as a low rotor hub 68, which may be a portion of the low pressure compressor 44, the fan 42, the fan drive gear system 48, or the like. A low rotor bevel gear 70 extends from the low rotor hub 68, and meshes with a low rotor bevel gear pinion 72 secured to the low rotor towershaft 64 to transmit power from the low speed spool 30 to the low rotor towershaft 64. Similarly, the high rotor towershaft 62 is connected to the high pressure compressor 52 via a high rotor bevel gear 74 secured to the high pressure compressor 52. The high rotor bevel gear 74 meshes with a high rotor bevel gear pinion 76 secured to the high rotor towershaft 62, with rotation of the high pressure compressor 52 resulting in rotation of the high rotor towershaft 62.

The high rotor bevel gear 74 and the low rotor bevel gear 70 are each located along the engine central longitudinal axis A between the low rotor thrust bearing 78 and the high rotor thrust bearing 80. The low rotor thrust bearing 78 is axially supportive of the low rotor hub 68, and the high rotor thrust bearing 80 is similarly axially supportive of the high pressure compressor 52.

Referring again to FIG. 3, the high rotor towershaft 62 and the low rotor towershaft 64 extend to the common gearbox housing 66. A low rotor power takeoff 82 and a high rotor power takeoff 84 are located in the gearbox housing 66, and are operably connected to the low rotor towershaft 64 and the high rotor towershaft 62, respectively. The low rotor power takeoff 82 includes a low rotor takeoff shaft 86 connected to the low rotor towershaft 64 via a low rotor takeoff bevel gear 88 secured to the low rotor takeoff shaft 86 and a low rotor takeoff bevel gear pinion 90 connected to the low rotor towershaft 64. Similarly, the high rotor power takeoff 84 includes a high rotor takeoff shaft 92 connected to the high rotor towershaft 62 via a high rotor takeoff bevel gear 94 secured to the high rotor takeoff shaft 92 and a high rotor takeoff bevel gear pinion 96 connected to the high rotor towershaft 62.

Figure 4:
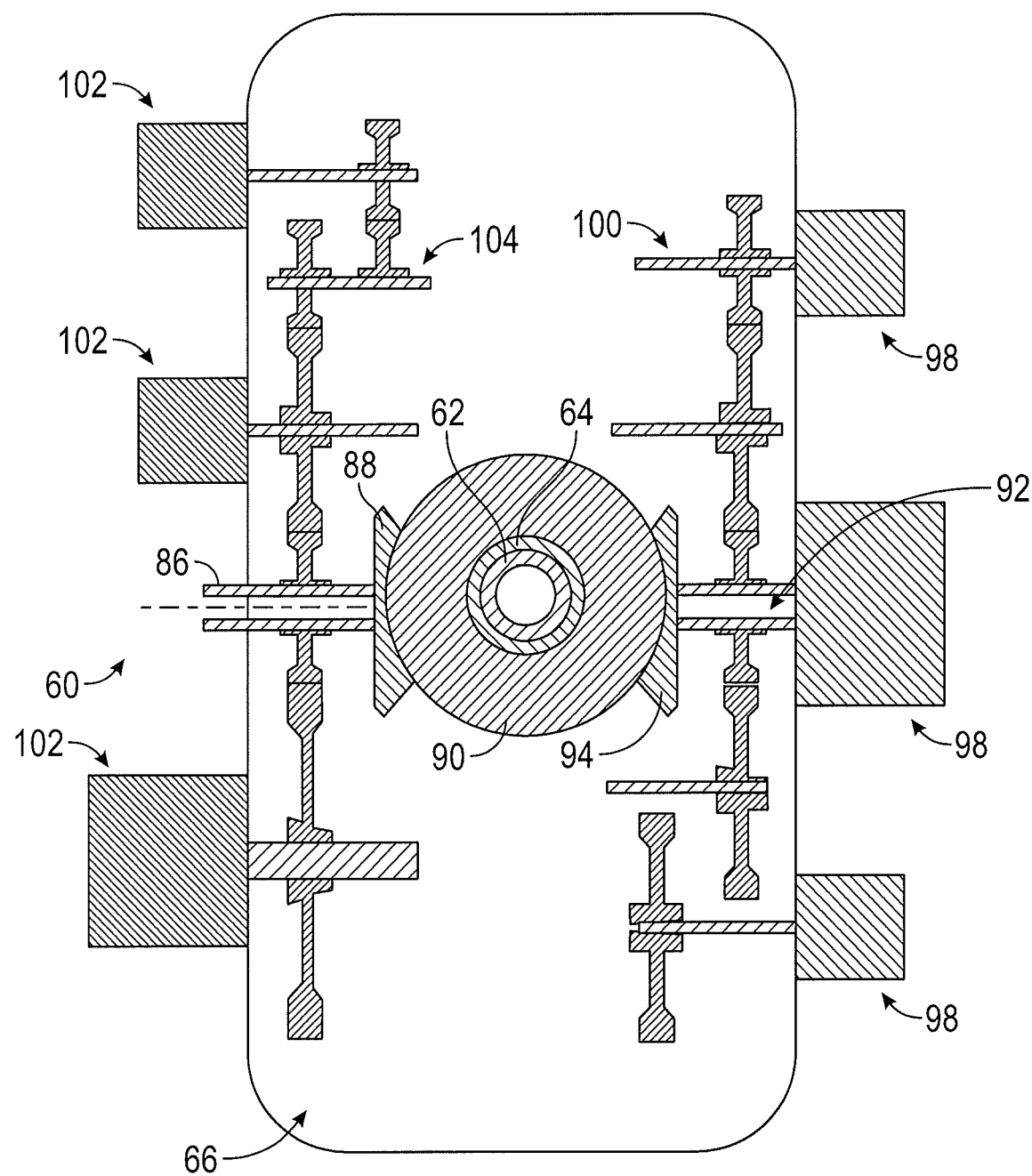
FIG. 4 is yet another partial cross-sectional view of an embodiment of a power takeoff and gearbox system of a gas turbine engine.

As shown in FIG. 4, the low rotor takeoff shaft 86 is connected, directly or indirectly, to one or more low rotor driven components 98, via a low rotor gear train 100. Similarly, the high rotor takeoff shaft 92 is connected, directly or indirectly, to one or more high rotor driven components 102, via a high rotor gear train 104.

The arrangement disclosed herein with concentric high rotor towershaft 62 and low rotor towershaft 64, extending to a common gearbox housing 66 for power distribution to accessory components, provides a relatively low axial length and low weight configuration, compared to other arrangements. Further, the common gearbox housing 66 simplifies mounting, lubrication system oil line routing, and other factors in gearbox usage. The orientation of the common gearbox housing 66 may be parallel to engine central longitudinal axis A as shown in FIG. 2, or in other embodiments may be perpendicular or oriented at other angles that may be desired for optimum installation and interface with aircraft subsystems.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A power takeoff and gearbox system of a multi-spool gas turbine engine, comprising:
    a low rotor towershaft operably connected to and driven by a first spool of the gas turbine engine; and
    a high rotor towershaft operably connected to and driven by a second spool of the gas turbine engine;
    wherein the high rotor towershaft and the low rotor towershaft are concentric and extend to a common gearbox housing;
    wherein the low rotor towershaft and high rotor towershaft are axially disposed, relative to an engine central longitudinal axis, between a first spool thrust bearing and a second spool thrust bearing.

2. The power takeoff and gearbox system of claim 1, wherein the low rotor towershaft is configured to be driven by rotation of a low pressure compressor of the gas turbine engine.

3. The power takeoff and gearbox system of claim 1, wherein the high rotor towershaft is configured to be driven by rotation of a high pressure compressor of the gas turbine engine.

4. The power takeoff and gearbox system of claim 1, further comprising:
    a first low rotor bevel gear fixed for rotation with the first spool; and
    a second low rotor bevel gear fixed to the low rotor towershaft and meshed with the first low rotor bevel gear such that rotation of the first spool drives rotation of the low rotor towershaft.

5. The power takeoff and gearbox system of claim 1, wherein the low rotor towershaft is rotationally connected to a low rotor power takeoff shaft at the gearbox housing.

6. The power takeoff and gearbox system of claim 5, wherein the low rotor power takeoff shaft is operably connected to one or more low rotor driven components, providing power thereto.

7. The power takeoff and gearbox system of claim 1, wherein the high rotor towershaft is rotationally connected to a high rotor power takeoff shaft at the gearbox housing.

8. The power takeoff and gearbox system of claim 7, wherein the high rotor power takeoff shaft is operably connected to one or more high rotor driven components, providing power thereto.

9. The power takeoff and gearbox system of claim 1, wherein the low rotor towershaft and the high rotor towershaft are co-rotating.

10. The power takeoff and gearbox system of claim 1, wherein the low rotor towershaft and the high rotor towershaft are counter-rotating.

11. A gas turbine engine, comprising:
    a high pressure compressor driven by a first shaft;
    a low pressure compressor driven by a second shaft; and
    a power takeoff and gearbox system comprising:
        a high rotor towershaft operably connected to and driven by rotation of the first shaft; and
        a low rotor towershaft operably connected to and driven by rotation of the second shaft;

wherein the high rotor towershaft and the low rotor towershaft are concentric and extend to a common gearbox housing;

wherein the low rotor towershaft and high rotor towershaft are axially disposed, relative to an engine central longitudinal axis, between a low rotor thrust bearing and a high rotor thrust bearing.

12. The gas turbine engine of claim 11, further comprising:
a first low rotor bevel gear fixed for rotation with the first shaft; and
a second low rotor bevel gear fixed to the low rotor towershaft and meshed with the first low rotor bevel gear such that rotation of the low pressure compressor drives rotation of the low rotor towershaft.

13. The gas turbine engine of claim 11, wherein the low rotor towershaft is rotationally connected to a low rotor power takeoff shaft at the gearbox housing.

14. The gas turbine engine of claim 13, wherein the low rotor power takeoff shaft is operably connected to one or more low rotor driven components, providing power thereto.

15. The gas turbine engine of claim 11, wherein the high rotor towershaft is rotationally connected to a high rotor power takeoff shaft at the gearbox housing.

16. The gas turbine engine of claim 15, wherein the high rotor power takeoff shaft is operably connected to one or more high rotor driven components, providing power thereto.

17. The gas turbine engine of claim 11, wherein the low rotor towershaft and the high rotor towershaft are co-rotating.

18. The gas turbine engine of claim 11, wherein the low rotor towershaft and the high rotor towershaft are counter-rotating.

* * * * *